United States Patent [19]
Hughes et al.

[11] 3,951,474
[45] Apr. 20, 1976

[54] INTERSHAFT FOIL BEARING

[75] Inventors: Nick M. Hughes, Scottsdale, Ariz.; Alexander Silver, Tarzana, Calif.

[73] Assignee: The Garrett Corporation, Los Angeles, Calif.

[22] Filed: Mar. 8, 1974

[21] Appl. No.: 449,421

[52] U.S. Cl. ................................ 308/9; 308/122; 308/183
[51] Int. Cl.[2] .......................................... F16C 7/04
[58] Field of Search .............. 308/183, 5, 9, 122, 308/DIG. 1, 72

[56] References Cited
UNITED STATES PATENTS

| | | |
|---|---|---|
| 3,366,427 | 1/1968 | Silver et al. .................... 308/122 |
| 3,517,973 | 6/1970 | Hirs ................................ 308/122 |
| 3,615,121 | 10/1971 | Barnett et al. ..................... 308/9 |
| 3,650,580 | 3/1972 | Beuemann ......................... 308/9 |
| 3,677,612 | 7/1972 | Barnett ............................ 308/9 |
| 3,746,233 | 7/1973 | Baver et al. ................ 308/DIG. 1 |
| 3,747,997 | 7/1973 | Winn .............................. 308/9 |
| 3,776,609 | 12/1973 | Pichette .......................... 308/9 |
| 3,834,775 | 9/1974 | Tuftias et al. ..................... 308/9 |

Primary Examiner—M. H. Wood, Jr.
Assistant Examiner—Richard A. Bertsch
Attorney, Agent, or Firm—Albert J. Miller

[57] ABSTRACT

Providing a compliant foil bearing midspan between two concentrically mounted, independently rotatable, elongated shafts to reduce the amplitude and raise the frequency of the shaft bending criticals.

19 Claims, 8 Drawing Figures

INTERSHAFT FOIL BEARING

The invention herein described was made in the course of or under a contract or subcontract thereunder with the Department of Air Force.

BACKGROUND OF THE INVENTION

It has become increasingly common to design turbomachinery, such as gas turbine engines, with concentrically mounted yet independently rotatable shafts. Because of the normal constraints on such concentric shafts, they are usually long and relatively flexible and subject to bending deflections at critical speeds. Examples of such turbomachinery, commonly referred to as two spool, can be found in U.S. Pats. Nos. 3,357,176, 3,680,309, and 3,589,132.

As a result of the shaft configurations mentioned above, support and/or bearing problems are frequently encountered with respect to these independently rotatable concentric shafts. Operating near or passing through critical shaft speeds creates considerable problems in shaft dynamics. Bending criticals, which are usually more severe than rigid body criticals, result in shaft eccentricities promoting unbalanced forces which, in turn, promote additional eccentricities.

Methods typically employed to resolve the above problems may include increasing shaft strength, decreasing bearing span, reducing operating speed range, dynamic "trim" balancing, and using a rolling contact midspan bearing and/or soft mounted end bearings. Each of these above methods imposes severe limitations upon the performance of the turbomachinery. For example, the limited space between the concentrically arranged, independently rotatable shafts makes it extremely difficult to provide a rolling contact bearing therebetween. In addition, it is difficult to provide lubrication to such rolling contact bearings in this location. Reference is made to U.S. Pat. No. 3,756,672 as an example of a soft mounted bearing directed toward a possible solution to the above-identified problem.

Fluid or gas bearings have recently been utilized in many applications for high speed turbomachinery. These fluid bearings generally comprise two relatively movable elements with a predetermined spacing therebetween. The spacing is filled with a fluid such as air, which, under dynamic conditions, forms a supporting wedge to provide sufficient support for a load by preventing contact between the two relatively movable elements. More recently, improved fluid bearings, particularly gas bearings of the hydrodynamic type, have been developed by providing foils in the space between the relatively rotatable bearing elements. Such foils, which are generally thin sheets of a generally compliant material, may be deflected by the hydrodynamic film forces between the adjacent bearing surfaces and the foils. The foils enhance the hydrodynamic characteristics of the fluid bearings and also provide improved operation under extreme load conditions when normal bearing failure might otherwise occur. Additionally, foil segments provide the added advantage of accommodating eccentricity of the relatively movable elements and further provide a cushioning and damping effect.

The ready availability of relatively clean process fluid, plant air or ambient atmosphere as the bearing fluid makes these hydrodynamic, fluid film lubricated, bearings particularly attractive for high speed turbomachinery. While in many applications these hydrodynamic or self-acting fluid bearings provide sufficient load carrying capacity from the pressure generated in the fluid film by the relative motion of the two converging surfaces, it is sometimes necessary to externally pressurize the fluid between the bearing surfaces to increase the load carrying capacity. While these externally pressurized or hydrostatic fluid bearings do increase the load carrying capacity they do introduce the requirement for an external source of fluid under pressure.

Examples of hydrodynamic and/or hydrostatic bearings assigned to the Assignee of this applications are: U.S. Pat. Nos. 3,215,479, 3,215,480, 3,366,427, 3,375,046, 3,382,014, 3,434,761, 3,434,762, 3,467,451, 3,511,544, 3,560,064, 3,615,121, 3,635,534, 3,642,331, 3,677,612.

SUMMARY OF THE INVENTION

The present invention is directed towards an arrangement wherein a fluid film lubricated compliant foil bearing is disposed between two relatively rotatable concentric shafts near the midspan thereof. If required, an external pressure source may be provided to increase the load carrying capacity of the fluid film midspan bearing. The ends of the shaft would be supported by conventional bearings which could be either rolling contact bearings mounted in oil film resilient mounts, fluid film bearings or in some cases, other fluid film lubricated compliant foil bearings.

DESCRIPTION OF THE PREFERRED EMBODIMENTS

Figure 1:
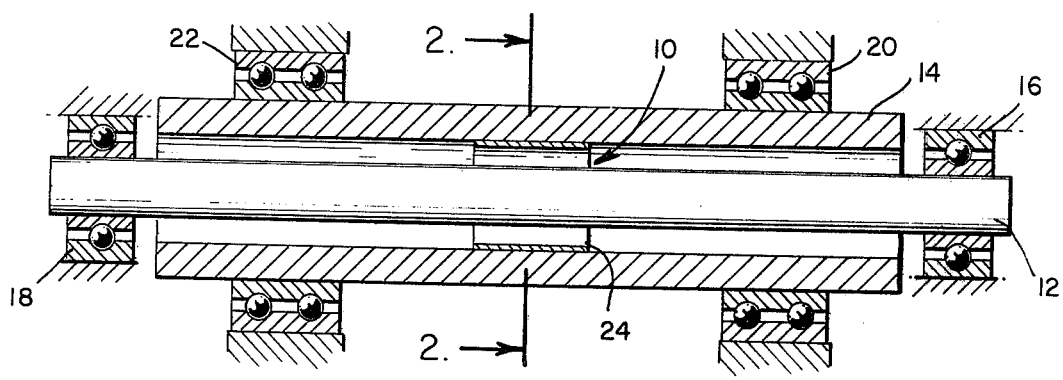
FIG. 1 is a sectional view of the present invention illustrating concentric, relatively rotatable, shafts having a hydrodynamic intershaft foil bearing.

As generally illustrated in FIG. 1, the hydrodynamic intershaft foil bearing 10 is disposed between relatively rotatable, concentric shafts 12 and 14. Inner shaft 12 is illustrated as supported at either end by rolling contact bearings 16 and 18, respectively. Concentrically arranged around inner shaft 12 is outer shaft 14 which is also illustrated as rotatably supported at either end by rolling contact bearings 20 and 22, respectively. The hydrodynamic intershaft foil bearing 10 is disposed between inner shaft 12 and outer shaft 14 generally near the midspan thereof.

Figure 2:
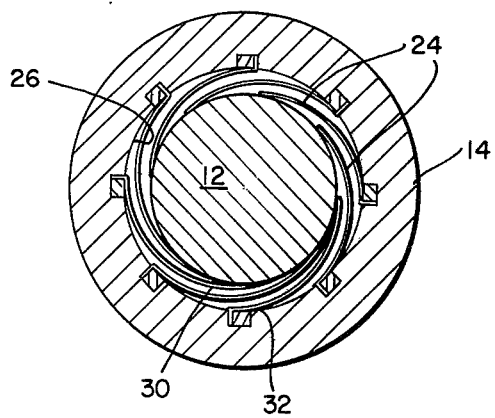
FIG. 2 is a cross-sectional view of the intershaft foil bearing taken along line 2—2 of FIG. 1.
Figure 3:
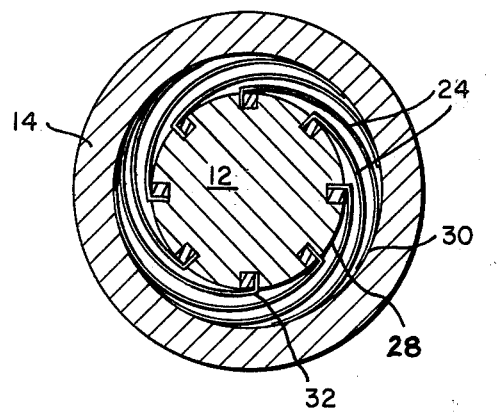
FIG. 3 is an alternate embodiment of the hydrodynamic intershaft foil bearing of FIGS. 1 and 2.
Figure 4:
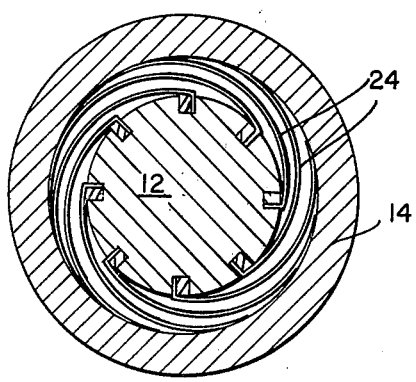
FIG. 4 is yet another alternate embodiment of the hydrodynamic intershaft foil bearing of FIGS. 1 and 2.

As illustrated in FIGS. 2, 3, and 4, the compliant metal foils 24 of the hydrodynamic intershaft foil bearing 10 may be mounted at the inner surface 26 of the outer shaft 14 or on the outer surface 28 of the inner shaft 12. Further, the outer shaft 14 can rotate in either the same or opposite direction as the inner shaft 12, provided that the drag on the free end 30 of the foils 24 always pulls with respect to the fixed end 32.

Specifically with respect to FIG. 2 where the foils are mounted at the inner surface 26 of the outer shaft 14, if the outer shaft 14 is rotating in a clockwise direction, the inner shaft 12 can be rotated in a counterclockwise direction at any speed, or in a clockwise direction at a speed less than the speed of rotation of the outer shaft 14. Additionally, the inner shaft 12 could be stationary. If the outer shaft 14 is stationary, then the inner shaft 12 must rotate counterclockwise. If, however, the outer shaft 14, having the foils 24 mounted thereon as shown in FIG. 2, is rotated in a counterclockwise direction, the inner shaft 12 must be rotated in a counterclockwise direction at a speed greater than the speed of rotation of the outer shaft 14 in order to provide a pulling drag on the free end 30 of the foils 24.

If the inner shaft 12 is rotated clockwise, the outer shaft 14 must rotate in the same direction at a greater speed. Counterclockwise rotation of the inner shaft 12 permits rotation of the outer shaft 14 in either direction with the limitation being that counterclockwise outer shaft rotation be less than the counterclockwise inner shaft rotation.

While the foils 24 are shown in FIG. 2 as extending counterclockwise from their fixed ends 32, they could likewise extend in a clockwise direction. The relative rotational relationships of the shafts 12 and 14 would then, however, be reversed.

In FIGS. 3 and 4, the foils 24 are shown affixed or mounted on the inner shaft 12. In FIG. 3, with the foils 24 extending clockwise from their fixed ends 32, the inner shaft 12 must rotate counterclockwise if the outer shaft 14 is stationary while the outer shaft 14 must rotate clockwise if the inner shaft 12 is stationary. With the inner shaft 12 rotating counterclockwise, the outer shaft 14 can be rotated clockwise at any speed or counterclockwise at a rotational speed less than the inner shaft. Clockwise rotation of the inner shaft 12 requires clockwise rotation of the outer shaft 14 at a greater speed.

In FIG. 4 the foils 24 are extending counterclockwise from their fixed ends 32 and thus the relative rotational directions of the two shafts 12 and 14 would be reversed from FIG. 3. While all possible rotational relationships have been discussed, in most cases the inner and outer shafts 12 and 14 respectively would be rotated in opposite directions to have the greatest relative rotation therebetween. The greater the relative rotation, the greater load carrying capacity of the bearing.

The foils 24 may be mounted on the shaft by any conventional method. One possible foil anchoring arrangement is disclosed in U.S. Pat. No. 3,615,121. Also, the foils 24 may be coated with a solid lubricant, such as disclosed in U.S. Pat. No. 3,677,612, to minimize friction at low speeds.

If for any particular application, the hydrodynamic intershaft foil bearing does not generate adequate load capacity at the low speeds of the first critical to maintain shaft displacements within the bearing sway space, a hydrostatic intershaft foil bearing may be utilized. Hydrostatic or externally pressurized foil bearings are generally described in U.S. Pat. No. 3,366,427.

Figure 5:
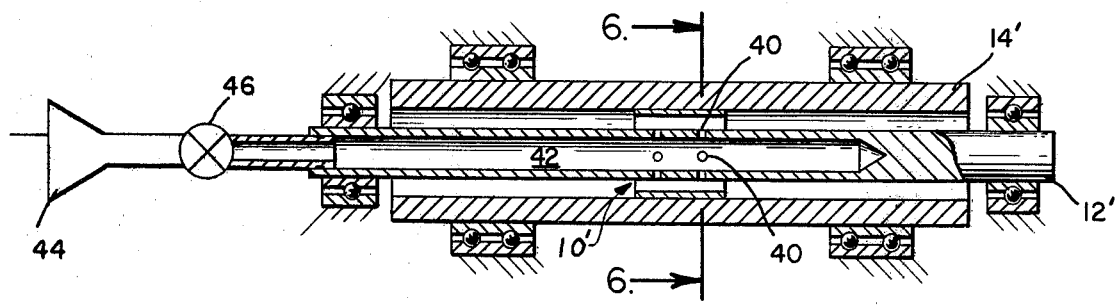
FIG. 5 is a sectional view of an alternate embodiment of the present invention illustrating an externally pressurized or hydrostatic intershaft foil bearing disposed between relatively rotatable concentric shafts.
Figure 6:
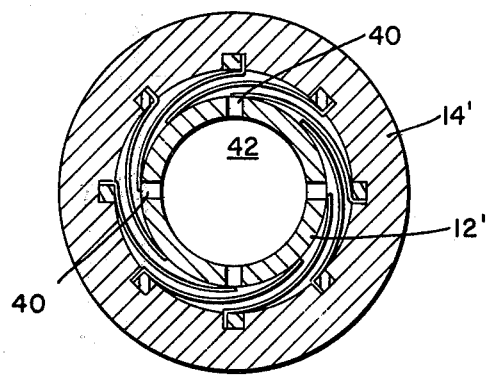
FIG. 6 is a cross-sectional view of the hydrostatic intershaft foil bearing taken along line 6—6 of FIG. 5.

The hydrostatic intershaft foil bearing is illustrated in FIGS. 5 and 6. The inner shaft $12^1$, concentrically rotatably disposed in the outer shaft $14^1$, is made hollow from one end to a point past the midspan thereof. A plurality of openings 40 extend from the interior 42 of the hollow inner shaft $12^1$ to communicate with the intershaft foil bearing $10^1$. A fluid pressure source 44 supplies fluid under pressure to the interior 42 of the inner shaft $12^1$ through a valve 46. The pressurized fluid supplied to the foil bearing increases the load capacity of the intershaft foil bearing $10^1$.

Figure 7:
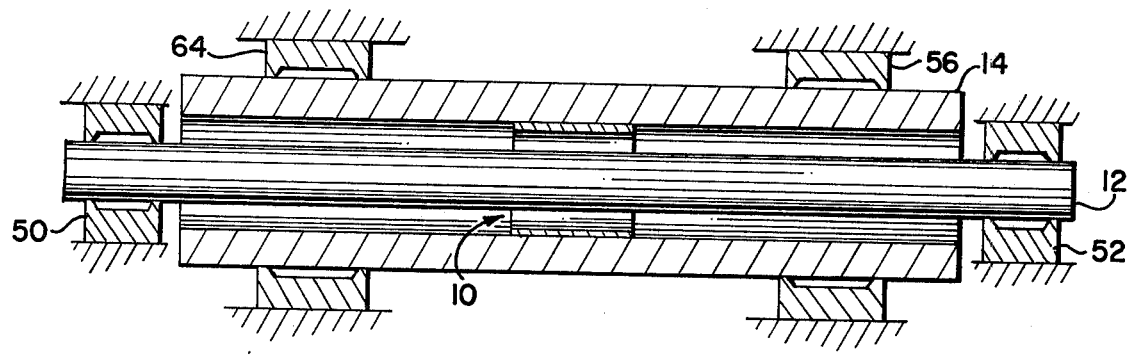
FIG. 7 is a sectional view of an alternate embodiment of the present invention illustrating the relatively rotatable concentric shafts supported by fluid film bearings.
Figure 8:
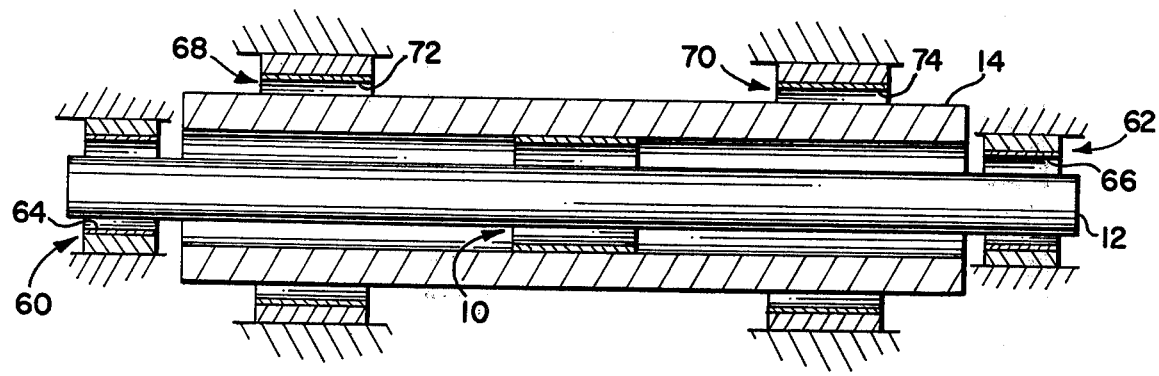
FIG. 8 is a sectional view of another alternate embodiment of the present invention illustrating the relatively rotatable concentric shafts supported by compliant foil bearings.

While FIG. 1 illustrates concentrically arranged inner shaft 12 and outer shaft 14 both rotatably supported at either end by rolling contact bearings, the inner shaft 12 and outer shaft 14 can also be supported by fluid film bearings or compliant foil bearings as illustrated in FIGS. 7 and 8, respectively. In FIG. 7, fluid film bearings 54 and 56 are disposed at either end of the outer shaft 14 while fluid film bearings 50 and 52 are disposed at either end of the inner shaft 12. The outer shaft 14 in FIG. 8 is supported at either end by compliant foil bearings 68 and 70 which include compliant foils 72 and 74, respectively. Likewise, the FIG. 8 inner shaft 12 is supported at either end by compliant foil bearings 60 and 62 which include compliant foils 64 and 66, respectively.

By providing midspan intershaft foil bearings, the critical shaft speed problem for concentric independently rotatable shafts can be substantially if not totally eliminated. The midspan foil bearing greatly reduces the shaft displacement amplitude when passing through a bending critical speed. Likewise, the bending critical speed frequency will be reduced. The foil bearing permits design simplicity, relaxation of maintenance and servicing requirements, easing of temperature limitations, low noise, longer bearing life and in most cases reduced friction.

While specific embodiments of the invention have been illustrated and described, such as a single midspan foil bearing, it is to be understood that these are provided by way of example only. It should be recognized that a plurality of spaced foil bearings could likewise be used if warranted. Thus the invention is not to be construed as being limited to the specific embodiments described but only by the proper scope of the following claims.

What we claim is:
1. In combination:
    a hollow outer shaft;
    first rolling contact bearing means to rotatably support said hollow outer shaft;
    an inner shaft concentrically disposed to independently rotate within said hollow outer shaft;
    second rolling contact bearing means to independently rotatably support said inner shaft within said hollow outer shaft; and
    a compliant foil bearing operably disposed between said inner shaft and said hollow outer shaft near the midspan thereof.
2. The combination of claim 1 wherein said compliant foil bearing is of the hydrodynamic type.
3. The combination of claim 1 wherein said compliant foil bearing is of the hydrostatic type.
4. The combination of claim 1 wherein said compliant foil bearing comprises a plurality of compliant foils mounted upon one of said shafts and extending therebetween.

5. In combination:
a hollow outer shaft;
first fluid film bearing means to rotatably support said hollow outer shaft;
an inner shaft concentrically disposed to independently rotate within said hollow outer shaft;
second fluid film bearing means to independently rotatably support said inner shaft within said hollow outer shaft; and
a compliant foil bearing operably disposed between said inner shaft and said hollow outer shaft near the midspan thereof.

6. The combination of claim 5 wherein said compliant foil bearing is of the hydrodynamic type.

7. The combination of claim 5 wherein said compliant foil bearing is of the hydrostatic type.

8. The combination of claim 5 wherein said compliant foil bearing comprises a plurality of compliant foils mounted upon one of said shafts and extending therebetween.

9. In combination:
a hollow outer shaft;
first compliant foil bearing means to rotatably support said hollow outer shaft;
an inner shaft concentrically disposed to independently rotate within said hollow outer shaft;
second compliant foil bearing means to independently rotatably support said inner shaft within said hollow outer shaft; and
third compliant foil bearing means operably disposed between said inner shaft and said hollow outer shaft near the midspan thereof.

10. The combination of claim 9 wherein said third compliant foil bearing means is of the hydrodynamic type.

11. The combination of claim 9 wherein said third compliant foil bearing means is of the hydrostatic type.

12. The combination of claim 9 wherein said third compliant foil bearing means comprise a plurality of compliant foils mounted upon one of said shafts and extending therebetween.

13. In combination:
a hollow outer shaft;
means to rotatably support said hollow outer shaft:
an inner shaft concentrically disposed to independently rotate within said hollow outer shaft;
means to independently rotatably support said inner shaft within said hollow outer shaft; and
a compliant foil bearing operably disposed between said inner shaft and said hollow outer shaft near the midspan thereof, said compliant foil bearing comprising a plurality of compliant foils each having one end thereof fixedly secured to said inner shaft and the other free end extending between said inner shaft and said outer shaft, the relative rotation between said inner shaft and said outer shaft providing a drag on the free end of each of said plurality of foils with respect to the fixed end of said foils.

14. In combination:
a hollow outer shaft;
means to rotatably support said hollow outer shaft;
an inner shaft concentrically disposed to independently rotate within said hollow outer shaft;
means to independently rotatably support said inner shaft within said hollow outer shaft; and
a compliant foil bearing operably disposed between said inner shaft and said hollow outer shaft near the midspan thereof, said compliant foil bearing comprising a plurality of compliant foils each having one end thereof fixedly secured to said outer shaft and the other free end extending between said outer shaft and said inner shaft, the relative rotation between said inner shaft and said outer shaft providing a drag on the free end of each of said plurality of foils with respect to the fixed end of said foils.

15. In combination:
an elongated hollow outer shaft;
first bearing means to rotatably support the ends of said hollow outer shaft;
an elongated inner shaft concentrically disposed to independently rotate within said hollow outer shaft;
second bearing means to independently rotatably support the ends of said inner shaft; and
a compliant foil bearing operably disposed between said inner shaft and said hollow outer shaft near the midspan thereof.

16. The combination of claim 15 wherein said compliant foil bearing is of the hydrodynamic type.

17. The combination of claim 15 wherein said compliant foil bearing is of the hydrostatic type.

18. The combination of claim 15 wherein said compliant foil bearing comprises a plurality of compliant foils mounted upon one of said shafts and extending therebetween.

19. In combination:
a hollow outer shaft;
means to rotatably support said hollow outer shaft;
an inner shaft concentrically disposed to independently rotate within said hollow outer shaft;
means to independently rotatably support said inner shaft within said hollow outer shaft; and
a compliant foil bearing operably disposed between said inner shaft and said hollow outer shaft near the midspan thereof;
said compliant foil bearing comprising a plurality of compliant foils mounted upon said outer shaft and extending between said outer shaft and said inner shaft;
said inner shaft hollow from one end thereof to near the midspan thereof and including a plurality of openings near the midspan thereof; and
a source of pressurized fluid operably connected to the hollow end of said inner shaft to provide pressurized fluid to said compliant foil bearing to force the free ends of said compliant foils outwardly away from said inner shaft.

* * * * *